US012732645B2

(12) United States Patent
Zhang et al.

(10) Patent No.: US 12,732,645 B2
(45) Date of Patent: Sep. 8, 2026

(54) MULTIMEDIA ON DEMAND METHOD, APPARATUS, SYSTEM, COMPUTATIONAL STORAGE DRIVE AND STORAGE MEDIUM

(71) Applicant: SAMSUNG ELECTRONICS CO., LTD., Suwon-si (KR)

(72) Inventors: Ruyi Zhang, Suwon-si (KR); Xue He, Suwon-si (KR); Peiwei Li, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 18/908,140

(22) Filed: Oct. 7, 2024

(65) Prior Publication Data

US 2026/0052282 A1 Feb. 19, 2026

(30) Foreign Application Priority Data

Aug. 14, 2024 (CN) .......................... 202411118538.2

(51) Int. Cl.

| | |
|---|---|
| ***H04N 21/232*** | (2011.01) |
| ***H04N 21/218*** | (2011.01) |
| ***H04N 21/2343*** | (2011.01) |
| ***H04N 21/236*** | (2011.01) |
| ***H04N 21/2389*** | (2011.01) |
| ***H04N 21/239*** | (2011.01) |
| ***H04N 21/472*** | (2011.01) |

(52) U.S. Cl.

CPC ..... *H04N 21/232* (2013.01); *H04N 21/21815* (2013.01); *H04N 21/236* (2013.01); *H04N 21/2389* (2013.01); *H04N 21/47202* (2013.01); *H04N 21/2343* (2013.01); *H04N 21/2393* (2013.01)

(58) Field of Classification Search

CPC ............ H04N 21/232; H04N 21/2389; H04N 21/47202; H04N 21/2343; H04N 21/236; H04N 21/2393; H04N 21/21815

See application file for complete search history.

(56) References Cited

U.S. PATENT DOCUMENTS

| | | |
|---|---|---|
| 7,305,695 B1 | 12/2007 | Ramakesavan |
| 9,351,020 B2 | 5/2016 | Good |
| 10,298,966 B2 | 5/2019 | Lee |
| 10,333,860 B2 | 6/2019 | Willis et al. |

(Continued)

FOREIGN PATENT DOCUMENTS

| | | |
|---|---|---|
| CN | 107147921 A | 9/2017 |
| WO | 2008/069531 A1 | 6/2008 |

*Primary Examiner* — Azizul Choudhury

(74) *Attorney, Agent, or Firm* — Sughrue Mion, PLLC

(57) ABSTRACT

A multimedia on demand system includes a host, and a computational storage drive. The host transmits, to the computational storage drive, a first request for multimedia on demand. The computational storage drive, in response to the first request, performs an on demand processing process for multimedia that corresponds to the first request to generate a corresponding on demand result, the on demand processing process including a flow control and one or more of a codec process or a multiplexing process for the multimedia. The computational storage drive transmits the on demand result to the host, and the host receives the on demand result from the computational storage drive.

14 Claims, 19 Drawing Sheets

(56) References Cited

U.S. PATENT DOCUMENTS

| | | | | |
|---|---|---|---|---|
| 2002/0138842 | A1* | 9/2002 | Chong | H04N 7/147 348/E7.086 |
| 2004/0181667 | A1* | 9/2004 | Venters, III | H04L 63/0428 713/164 |
| 2011/0173345 | A1* | 7/2011 | Knox | H04L 67/565 709/246 |
| 2011/0296048 | A1* | 12/2011 | Knox | H04L 65/765 709/231 |
| 2021/0144517 | A1* | 5/2021 | Guim Bernat | G06F 9/5072 |
| 2022/0188028 | A1* | 6/2022 | Mesnier | G06F 3/0605 |
| 2022/0236911 | A1* | 7/2022 | Jones | G06F 3/0679 |
| 2023/0195372 | A1 | 6/2023 | Kachare et al. | |

* cited by examiner

FIG. 8 host command management for multimedia on demand computational storage drive 500 controller 501 flash memory stream controller 505-1 codec controller 505-2 stream controller 505-1 format package multiplex 506-1 data stream command stream

FIG. 12

| | | | | | | | |
|---|---|---|---|---|---|---|---|
| input related data | decode | reconstruction [resample] | frame estimate | encode | frame buffer | | |
| | input related data | decode | reconstruction [resample] | frame estimate | encode | frame buffer | |
| | | input related data | decode | reconstruction [resample] | frame estimate | encode | frame buffer |

Figure 13:
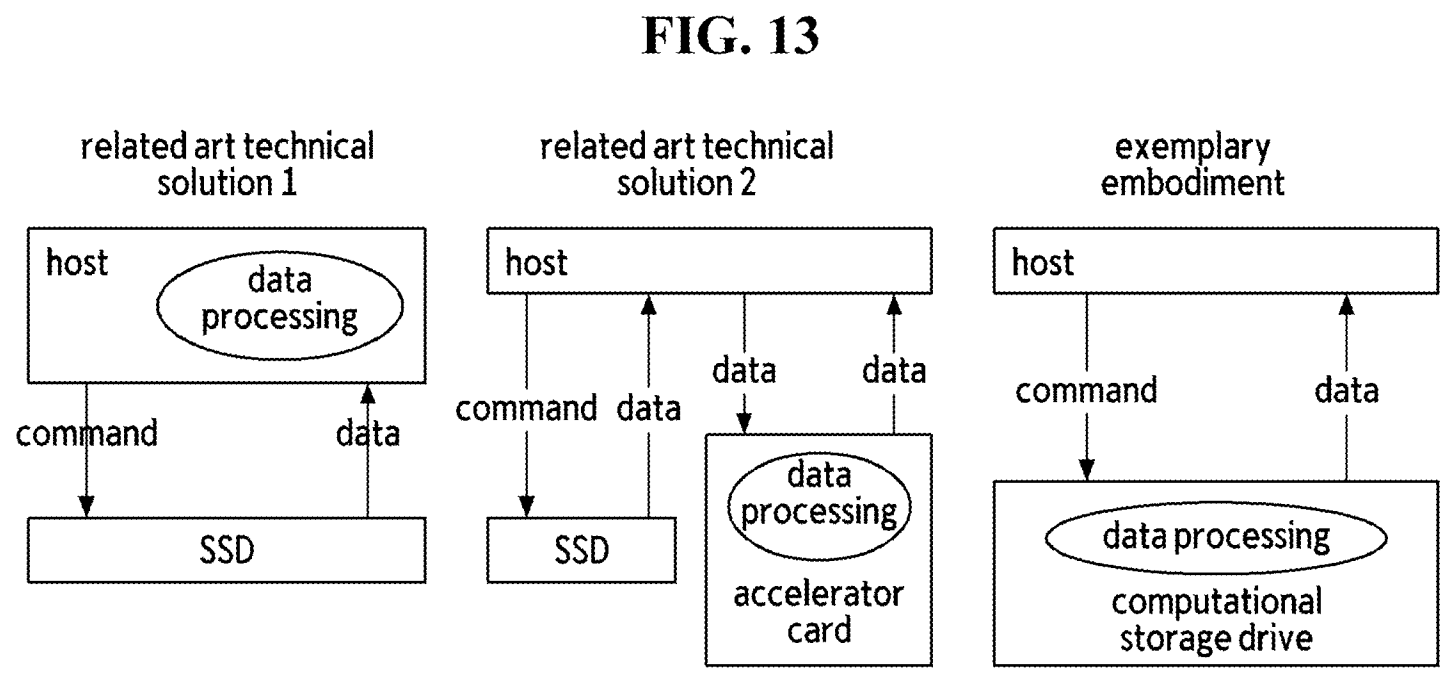

FIG. 13 related art technical solution 1
host
data processing
command
data
SSD related art technical solution 2
host
command
data
SSD
data
data
data processing
accelerator card exemplary embodiment
host
command
data
data processing
computational storage drive

MULTIMEDIA ON DEMAND METHOD, APPARATUS, SYSTEM, COMPUTATIONAL STORAGE DRIVE AND STORAGE MEDIUM

CROSS-REFERENCE TO RELATED APPLICATION

This application claims priority to Chinese Patent Application No. 202411118538.2 filed on Aug. 14, 2024 in the State Intellectual Property Office of China, the contents of which being herein incorporated by reference in its entirety.

BACKGROUND

The present disclosure relates to a technical field of multimedia technology and, more specifically, to a multimedia on demand method, an apparatus, a system, a computational storage drive and a storage medium.

Data of video on demand is usually stored in a storage device, such as an SSD, in advance, while a related program runs on a server at a host side, and a video on demand service needs to read corresponding data from the SSD to the host side in real time, and then perform a series of operations on the data at the host side. The core technologies involved in this process are: encoding, decoding, and transcoding. Encoding is to compress video signals with large amounts of data, so as to transmit and store the video signals. Decoding is an inverse process of encoding, while transcoding is an operation for better compatibility. Transcoding is a process of, for example, resolution conversion and secondary encapsulation so as to meet different decoding and display capabilities of different devices.

In related art technologies, a scheme of implementing complete software on the host side and performing encoding and decoding operations on read video data may lead to high CPU load, high power consumption, and high hardware performance requirements on the host side. On the other hand, in an on demand scheme of hardware expansion acceleration on the host side, it is necessary to transfer assignment between the host side and an accelerator card, which may cause problems such as additional delay and aggravating load of bus bandwidth, increasing the cost of hardware, and increasing power consumption and the like.

SUMMARY

It is an aspect to provide a multimedia on demand method, an apparatus, a system, a computational storage drive and a storage medium, to at least address the above technical disadvantages of software on the host side and/or hardware expansion acceleration on the host side and other technical disadvantages not mentioned above.

According to an aspect of one or more embodiments, there is provided a multimedia on demand method comprising receiving, by a computational storage drive from a host, a first request for multimedia on demand; in response to the first request, performing, by the computational storage drive, an on demand processing process for multimedia that corresponds to the first request to generate a corresponding on demand result, the on demand processing process comprising a flow control and at least one of a codec process or a multiplexing process for the multimedia; and transmitting the on demand result to the host.

According to another aspect of one or more embodiments, there is provided a multimedia on demand system comprising a host, and a computational storage drive. The host transmits, to the computational storage drive, a first request for multimedia on demand. The computational storage drive, in response to the first request, performs an on demand processing process for multimedia that corresponds to the first request to generate a corresponding on demand result, the on demand processing process comprising a flow control and at least one of a codec process or a multiplexing process for the multimedia. The computational storage drive transmits the on demand result to the host, and the host receives the on demand result from the computational storage drive.

According to yet another aspect of one or more embodiments, there is provided a computational storage drive comprising processing circuitry configured to receive, from a host, a first request for multimedia on demand; in response to the first request, perform an on demand processing process for multimedia that corresponds to the first request to generate a corresponding on demand result, the on demand processing process comprising a flow control and at least one of a codec process or a multiplexing process for the multimedia; and transmit the on demand result to the host.

BRIEF DESCRIPTION OF THE DRAWINGS

The accompanying drawings herein, which are incorporated into and form a part of the specification, illustrate embodiments consistent with the present disclosure and are used in conjunction with the specification to explain the principles of the present technology and do not constitute an undue limitation of the present disclosure.

FIG. 8 illustrates a schematic diagram of a data flow interaction, according to an exemplary embodiment;

FIG. 12 illustrates a schematic diagram of a pipeline, according to an exemplary embodiment;

FIG. 13 illustrates a comparison diagram of a related art solution with an exemplary embodiment;

DETAILED DESCRIPTION

Figure 1:
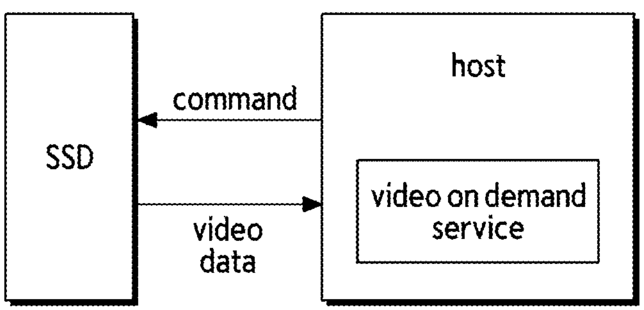
FIG. 1 illustrates a schematic diagram of an on demand solution for complete software implemented at a host side, according to the related art.

In order to enable a person of ordinary skill in the art to better understand various embodiments, the various embodiments will be described clearly and completely in the following, in conjunction with the accompanying drawings.

It is noted that terms "first", "second" and the like in the specification and claims and in the accompanying drawings are used for distinguishing similar objects, and need not to be used for describing a particular order or sequence. It should be understood that these terms may be interchanged, where appropriate, so that the embodiments described herein may be implemented in an order other than those illustrated or described herein. The embodiments described herein do not represent all embodiments consistent with the present disclosure. Rather, the embodiments are only examples of apparatuses and methods consistent with some aspects of the present disclosure as detailed in the appended claims.

It is noted herein that a phrase "at least one of several items" as it appears in the present disclosure is intended to encompass three parallel cases of "any one of the several items", "a combination of any number of the several items", and "all of the several items". For example, "including at least one of A or B" includes within its scope "only A", "only B", and "A and B.". Another example is "performing at least one of step 1 or step 2", which includes within its scope "performing only step 1", "performing only step 2", and "performing both step 1 and step 2."

In a related art technology, data for multimedia on demand such as a video is usually stored in a storage device, such as a Solid State Drive (SSD), in advance, while a related art program runs on a server at a host side, and the video on demand service needs to read the corresponding data from the SSD to the host side in real time, and then perform a series of operations on the data at the host side. The core technologies involved in this process are: encoding, decoding, transcoding. Encoding is to compress video signals of large amounts of data, so as to transmit and store the video signals. Decoding is an inverse process of encoding, while transcoding is an operation for better compatibility. Transcoding is a process of, for example, resolution conversion and secondary encapsulation so as to meet different decoding and display capabilities of different devices. The existing video codec standards are mainly formulated and released by an International Organization for Standardization (ISO) and an ITU-T for ITU Telecommunication Standardization Sector (ITU-T), mainstream coding standards are H.264 and H.265, both standards support streaming and H.265 has higher transmission bandwidth and hardware performance requirements.

According to some embodiments, a multimedia on demand method, which is applied to a computational storage drive may include receiving, from a host, a first request for multimedia on demand; in response to the first request, performing an on demand processing process for a corresponding multimedia to generate a corresponding on demand result; wherein the on demand processing process includes a flow control and at least one of a codec process and a multiplexing process for the corresponding multimedia; transmitting the on demand result to the host.

In some embodiments, the computing storage device may include a processor and an integrated circuit chip; the performing the on demand processing process for the corresponding multimedia may include performing, by the processor, the flow control; wherein the flow control includes a codec control and a request control, the codec control being performed based on the request control; performing, by the integrated circuit chip, at least one of the codec process and the multiplexing process.

In some embodiments, the processor may include a stream controller and a codec controller; the integrated circuit chip may include a multiplexer and a codec; the performing, by the processor, the flow control may include performing, by the stream controller, the request control; performing, by the codec controller, the codec control; wherein the performing, by the stream controller, the request control may include receiving the first request; in response to the first request, performing the operations of: in a case where request content of the first request is to obtain source data, requesting the source data from a controller of the computational storage drive; in a case where an encoding parameters of the source data does not satisfy a preset requirement of encoding parameters, instructing the codec controller by a transcoding request to control the codec to transcode the source data and use the transcoded source data as the on demand result; in a case where the encoding parameters of the source data satisfies the preset requirement of encoding parameters, instructing the codec controller by an encapsulation request to control the multiplexer to encapsulate the source data and use the encapsulated source data as the on demand result; in a case where the request content of the first request is to change a resolution or to change an encapsulation format, instructing the codec controller by an encapsulation request to control the multiplexer to encapsulate corresponding multimedia data in accordance with the request content of the first request and use the encapsulated multimedia data as the on demand result; wherein the performing, by the codec controller, the codec control includes: controlling operation of the codec and the multiplexer based on the codec control; setting parameters of the codec based on the first request.

In some embodiments, the performing, by the codec controller, the codec control may further include performing memory management during the codec process; performing memory access management during data movement between the controller of the computational storage drive and the integrated circuit chip.

In some embodiments, the performing, by the integrated circuit chip, the at least one of the codec process and the multiplexing process may include at least one of: performing, by the multiplexer, the multiplexing process; performing, by the codec, the codec process.

In some embodiments, the performing, by the codec, the codec process may include performing the following processes in sequence on the source data based on the parameters set by the codec controller to obtain the on demand result: decoding; performing re-sampling and scaling, reconstructing image in a case of to-be-transcoded; and encoding.

In some embodiments, the performing, by the codec, the codec process may further include in a pipeline form, performing the following processes in sequence on the source data based on the parameters set by the codec controller to obtain the on demand result: decoding, reconstructing; adjusting resolution by means of resampling in a case where a usage rate of the codec is greater than a preset threshold; frame estimating, encoding, frame buffering.

In some embodiments, the receiving, from the host, the first request for multimedia on demand may include receiving, from the host, the first request for multimedia on demand in a case where corresponding multimedia cache data is not looked up in the host.

In some embodiments, the receiving, from the host, the first request for multimedia on demand may include receiving, from the host, the first request for multimedia on demand under a predetermined scenario; wherein the predetermined scenario may include creating the first request based on a second request for multimedia on demand received by the host from the Internet if the second request is valid and a search for corresponding multimedia cache data in the host based on the second request fails; wherein the first request may include identification information of a corresponding multimedia.

A multimedia on demand method, which is applied to a host, may include transmitting, to a computational storage drive, a first request for multimedia on demand; wherein the first request is used to obtain a corresponding on demand result generated by an on demand processing process for a corresponding multimedia performed by the computational storage drive in response to the first request; wherein the on demand processing process includes a flow control and at least one of a codec process and a multiplexing process for the corresponding multimedia; and receiving the on demand result from the computing storage device.

A multimedia on demand apparatus, which is applied to a computational storage drive, may include a request receiving module configured to receive, from a host, a first request for multimedia on demand; an on demand performing module configured to in response to the first request, perform an on demand processing process for a corresponding multimedia to generate a corresponding on demand result; wherein the on demand processing process includes a flow control and at least one of a codec process and a multiplexing process for the corresponding multimedia; a result transmitting module configured to transmit the on demand result to the host.

A multimedia on demand apparatus, which is applied to a host, may include a request transmitting module configured to transmit, to a computational storage drive, a first request for multimedia on demand; wherein the first request is used to obtain a corresponding on demand result generated by an on demand processing process for a corresponding multimedia performed by the computational storage drive in response to the first request; wherein the on demand processing process includes a flow control and at least one of a codec process and a multiplexing process for the corresponding multimedia; a result receiving module configured to receive the on demand result from the computational storage drive.

A multimedia on demand system may include a host and a computational storage drive; the host transmits, to the computational storage drive, a first request for multimedia on demand; the computational storage drive, in response to the first request, performs an on demand processing process for a corresponding multimedia to generate a corresponding on demand result; wherein the on demand processing process includes a flow control and at least one of a codec process and a multiplexing process for the corresponding multimedia; the computational storage drive transmits the on demand result to the host; the host receives the on demand result from the computational storage drive.

A computational storage drive may include a computing module configured to: receive, from a host, a first request for multimedia on demand; in response to the first request, perform an on demand processing process for a corresponding multimedia to generate a corresponding on demand result; wherein the on demand processing process includes a flow control and at least one of a codec process and a multiplexing process for the corresponding multimedia; and transmit the on demand result to the host.

A computer readable storage medium may stores instructions, wherein the instructions, when run by at least one computing apparatus, cause the at least one computing apparatus to perform any of the multimedia on demand methods described above.

A system may include at least one computing apparatus and at least one storage apparatus storing instructions, wherein the instructions, when run by the at least one computing apparatus, cause the at least one computing apparatus to perform any of the multimedia on demand methods described above.

Various embodiments provided by the present disclosure have at least the following beneficial effects:

According to the multimedia on demand method, apparatus, system, computational storage drive, and storage medium of various embodiments, the computational storage drive (CSD) may be used instead of a Solid State Drive (SSD), and the multimedia on demand process such as encoding and decoding may be performed in the computational storage drive, which avoids occupation and consumption of the CPU when encoding and decoding is performed at the host side, and reduces the use and maintenance costs of the hardware compared to introducing an additional accelerator card in addition to the SSD. Performing data processing inside the CSD allows a data transmission path between the host side and the CSD to be maintained, and avoids increase in latency and bandwidth load caused by the need for an additional transmission path.

After replacing the SSD with the computational storage drive, the combination of the integrated circuit chip and the CPU reduces the hardware use and maintenance costs compared to the introduction of the additional accelerator card in addition to the SSD.

FIG. 1 illustrates a schematic diagram of an on demand solution for complete software implemented at a host side, according to the related art.

Referring to FIG. 1, in the relevant art on demand solution, video data that is read may be encoded and decoded by way of implementing the complete software on the host side. Specifically, a video on demand service software at the host side may acquire video data stored in a SSD in a manner of transmitting a command related to a data acquisition request to the SSD, receive video data from the SSD, and perform subsequent processes of the video on demand service, such as encoding, decoding, transcoding, and other processes, on the acquired video data at the host side. Since video on demand is a computationally intensive task, in order to improve performance of a codec, various sub-modules run in parallel on almost all Central Processing Units (CPUs) of the host side, thus overall concurrency of an on demand system depends on hardware performance of a server of the host side. It may be seen that original amount of data transmission and transmission load are maintained by implementing the on demand solution for complete software at the host side.

Figure 2:
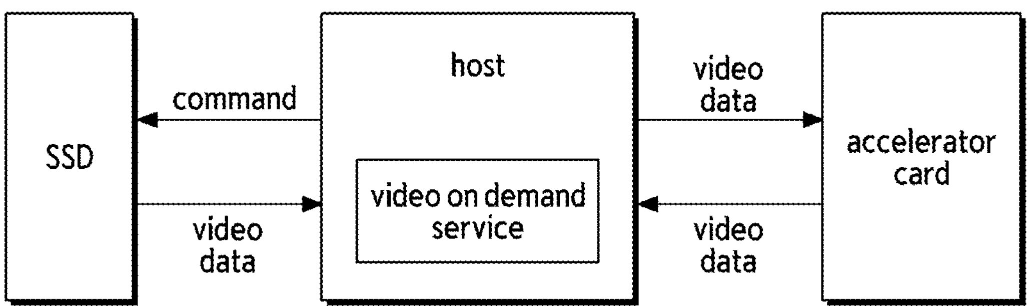
FIG. 2 illustrates a schematic diagram of implementing an on demand solution by hardware acceleration at a host side, according to the related art.

FIG. 2 illustrates a schematic diagram of implementing an on demand solution by hardware acceleration at a host side, according to the related art.

Referring to FIG. 2, an on demand service may alternatively be implemented by way of expanding the host side by adding an accelerator card through a Peripheral Component Interconnect express (PCIe) interface at the host side. Specifically, a video on demand service software at the host side may acquire video data from a SSD by means of a data acquisition command, receive the video data from the SSD, and then transmit the acquired video data to the accelerator card to realize data processes, such as encoding, decoding, transcoding, and the like, and then receive the processed video data from the accelerator card. Unlike the above solution of implementing the on demand solution for complete software at the host side, the solution of expanding the accelerator card may use software to complete on demand streaming logic, but uses the accelerator card to implement the codec. This related art solution allows the efficiency of the codec to be somewhat improved by adding additional hardware to assist the codec.

As may be seen from the related art, the related art solutions are plagued by the disadvantages of high power consumption, high cost and low data transmission efficiency. The different solutions may be improved in a certain aspect, but there are still some unavoidable disadvantages.

For example, the host side implementing the on demand solution for complete software as illustrated in FIG. 1 has the following specific disadvantages:

(1) High concurrency of video on demand may lead to high load on all CPUs, which in turn may cause serious interference with other tasks;

(2) The high load of the CPUs also leads to an increase in overall power consumption;

(3) High hardware performance requirements of video on demand means that a high-quality CPU/Dynamic Random Access Memory (DRAM)/STORAGE (i.e., a device or medium used to store and retain data) are needed, and the cost of hardware may be increased accordingly;

The on demand solution by hardware acceleration at the host side as illustrated in FIG. 2 has the following specific disadvantages:

(1) A data transmission path is increased, that is, there is a need to transfer work assignment between the host side and the accelerator card, which may cause additional delay and aggravate bus bandwidth load, and in a case of high concurrency, server peripheral bandwidth may become a bottleneck of an IO (Input/Output);

(2) The expanded accelerator card may increase additional hardware cost;

(3) The increase in hardware may increase power consumption to some extent.

In order to address the above disadvantages, the present disclosure provides a multimedia on demand method, apparatus, system, computational storage drive, and storage medium, in which a computational storage drive may be introduced into a process for a multimedia (such as a video) on demand service, instead of a conventional SSD, and a multimedia on demand process, such as encoding and decoding, may be performed in the computational storage drive, which may avoid occupation and consumption of the CPU when encoding and decoding is performed at the host side, and may reduce hardware use and maintenance costs compared to introducing an additional accelerator card in addition to the conventional SSD. Performing data processes inside the computational storage drive allows a data transmission path between the host side and the computational storage drive to be maintained, and avoids an increase in latency and bandwidth load caused by the need for an additional transmission path.

Various exemplary embodiments of a multimedia on demand method and, apparatus, system, computational storage drive, and storage medium will be specifically described with reference to FIGS. 3 through 19.

Figure 3:
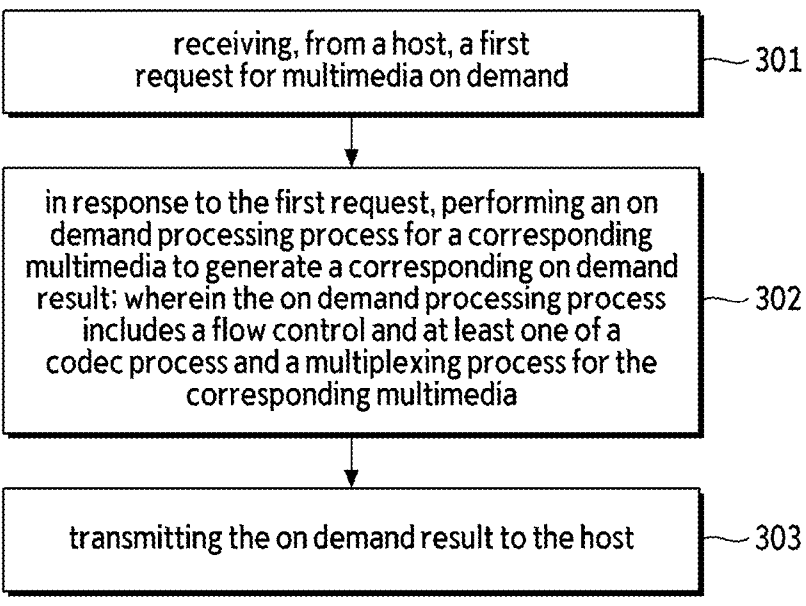
FIG. 3 illustrates a flowchart of a multimedia on demand method applied to a computational storage drive, according to an exemplary embodiment.

FIG. 3 illustrates a flowchart of a multimedia on demand method applied to a computational storage drive, according to an exemplary embodiment.

Referring to FIG. 3, at operation 301, a first request for multimedia on demand may be received from a host. For example, a computational storage drive may receive the first request for the multimedia on demand from the host.

According to an exemplary embodiment, a multimedia (such as a video) on demand service is realized by introducing a computational storage drive, and a function of the host side may be simplified to transmitting a first request or a related command for multimedia on demand to the computational storage drive. The computational storage drive may be implemented using a device such as an SSD that has been modified to add computational features consistent with exemplary embodiments of the present disclosure. It may be understood that the present disclosure will describe various exemplary embodiments in terms of video on demand (VOD), but embodiments are not limited to video as a form of the multimedia on demand service. In some embodiments, the form of the multimedia on demand service may include movie on demand (MOD), news on demand (NOD), and the like.

According to an exemplary embodiment, the receiving, from the host, the first request for multimedia on demand may include receiving, from the host, the first request for multimedia on demand in a case in which corresponding multimedia cache data is not looked up in the host.

According to an exemplary embodiment, the receiving, from the host, the first request for multimedia on demand may include receiving, from the host, the first request for multimedia on demand under a scenario that includes creating the first request based on a second request for multimedia on demand received by the host from the Internet if the second request is valid and a search for corresponding multimedia cache data in the host based on the second request fails. The first request may include identification information of a corresponding multimedia.

According to an exemplary embodiment, the creating the first request may include receiving a second request for multimedia on demand transmitted from the Internet, checking a validity of the second request, in a case in which the second request is valid, searching for corresponding multimedia cache data in the host based on the second request, in a case in which the searching succeeds, using the multimedia cache data as the on demand result, and in a case in which the searching fails, creating the first request based on the second request. The first request may include identification information of a corresponding multimedia.

Figure 4:
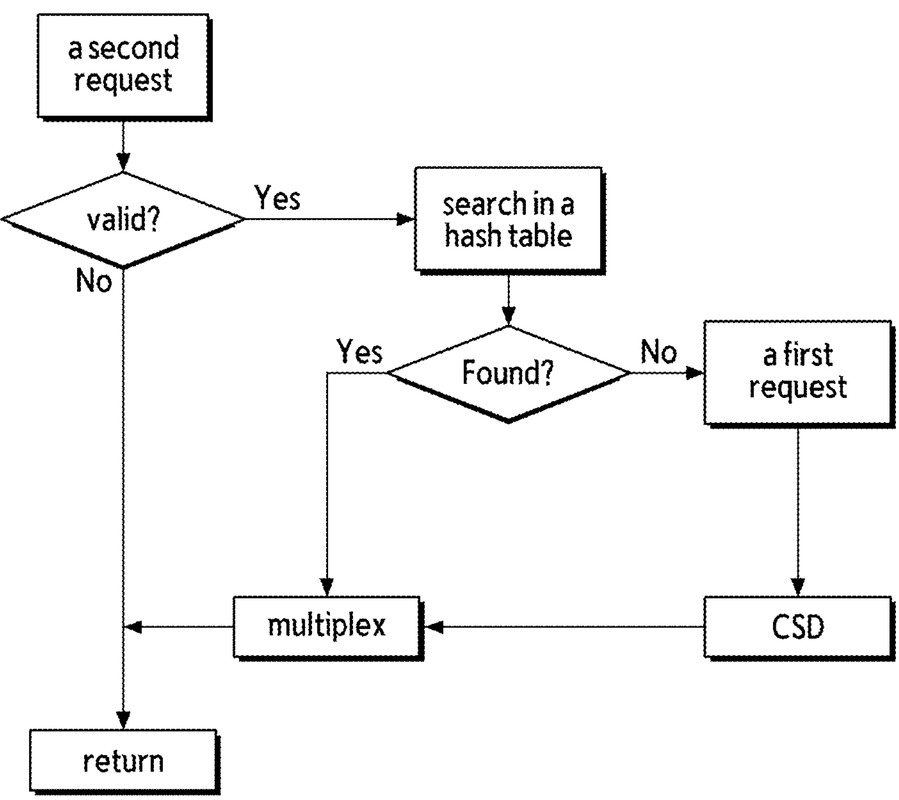
FIG. 4 illustrates a flowchart of a command management for multimedia on demand, according to an exemplary embodiment.

FIG. 4 illustrates a flowchart of a command management for multimedia on demand, according to an exemplary embodiment.

Referring to FIG. 4, according to an exemplary embodiment, the second request for multimedia (such as a video) on demand may be received by the host from the Internet, and a validity of the second request may be checked. If the second request is valid, a search may be made in a corresponding hash table to find whether there is an eligible video stream cache in the host. If the eligible video stream cache is found in the host, the corresponding data stream may be multiplexed and returned to a transmitter of the second request in the Internet. If the eligible video stream cache is not found, an on demand command with a unique video identity document (ID) may be created as the first request and the first request may be transmitted to the computational storage drive (CSD) to realize the multimedia (such as a video) on demand service by the computational storage drive. The computational storage drive (CSD) may receive the first request.

Referring back to FIG. 3, at operation 302, in response to the first request, an on demand processing process for a corresponding multimedia may be performed to generate a corresponding on demand result. The on demand processing process may include a flow control and at least one of a codec process or a multiplexing process for the corresponding multimedia. For example, the CSD may perform flow control and at least one of the codec process or a multiplexing process for the corresponding multimedia.

At operation 303, the on demand result may be transmitted to the host. For example, the CSD may transmit the on demand result to the host.

According to an exemplary embodiment, the computational storage drive (CSD) may include a processor and an integrated circuit chip. The performing the on demand processing process for the corresponding multimedia may include performing, by the processor, the flow control. The flow control may include a codec control and a request control, the codec control being performed based on the request control. The performing the on demand processing process for the corresponding multimedia may further include performing, by the integrated circuit chip, at least one of the codec process or the multiplexing process.

According to an exemplary embodiment, the computational storage drive may include the processor and the integrated circuit chip that perform data processing. Since the above multimedia on demand processing process may include operations such as a codec process, a multiplexing process for multimedia, and a flow control, the flow control in the on demand processing process may be performed by the processor in the computational storage drive, and the codec process and/or the multiplexing process in the on demand processing may be performed by the integrated circuit chip. It may be understood that, in some embodiments, the integrated circuit chip may perform the codec process and/or the multiplexing process in the on demand processing process. It may be understood that, in some embodiments, the integrated circuit chip may perform the codec process and the multiplexing process in the on demand processing, while both the codec process and the multiplexing process may not be performed during a single multimedia on demand processing process, e.g., at least one of the codec process or the multiplexing process may be performed as required for on demand. The flow control may include a codec control and a request control, and the codec control may be performed based on the request control.

Figure 5:
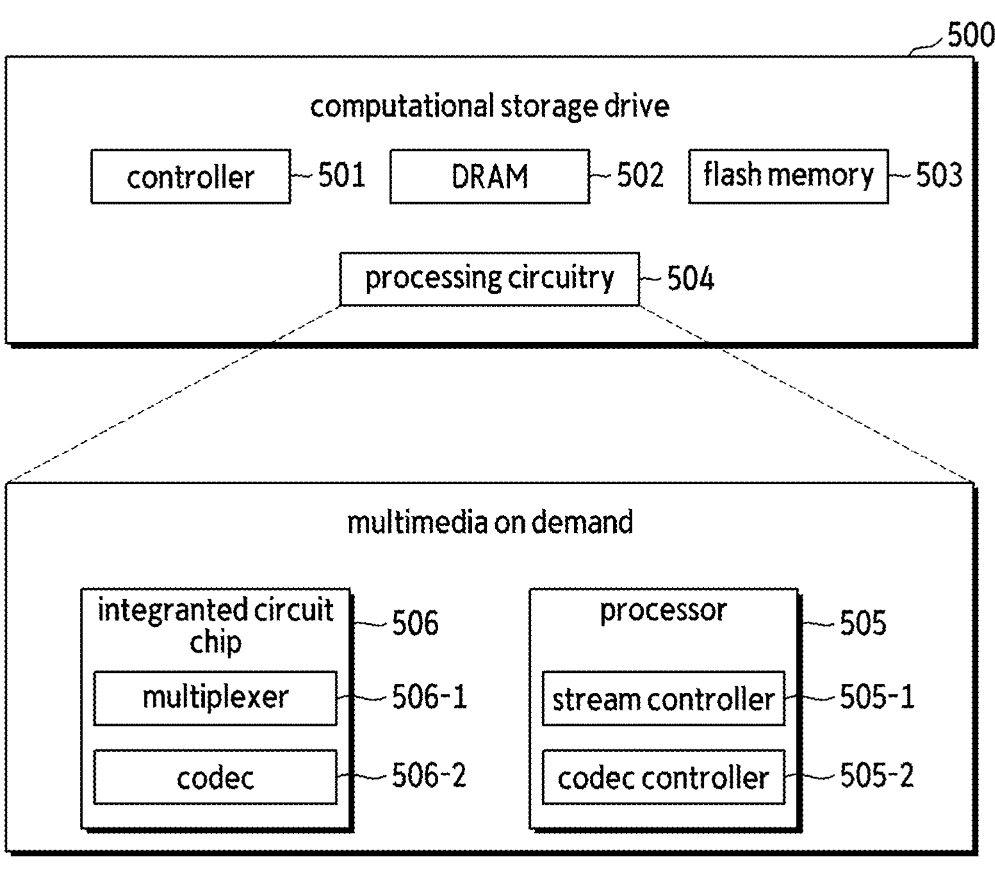
FIG. 5 illustrates a schematic diagram of a structure of a computational storage drive, according to an exemplary embodiment.

FIG. 5 illustrates a schematic diagram of a structure of a computational storage drive, according to an exemplary embodiment.

Referring to FIG. 5, according to an exemplary embodiment, a computational storage drive 500 may include a controller 501, a dynamic random access memory (DRAM) 502, a flash memory 503, and processing circuitry 504, and the above on demand processing process of the multimedia on demand method of the exemplary embodiment may be realized in the processing circuitry 504 by a multimedia on demand module executed by the processing circuitry 504. In an embodiment, the processor 505 and the integrated circuit chip 506 that may be included in the computational storage drive may be integrated in the processing circuitry 504. The integrated circuit chip 506 may be implemented using a Field Programmable Gate Array (FPGA). After replacing the conventional SSD with the computational storage drive, a combination of the FPGA and the processor 505 reduces the hardware use and maintenance costs compared to the introduction of the additional accelerator card in addition to the conventional SSD. It is understood that, in some embodiments, the integrated circuit chip 506 may also be realized by using a programmable Application Specific Integrated Circuit (ASIC) chip and the like.

Figure 6:
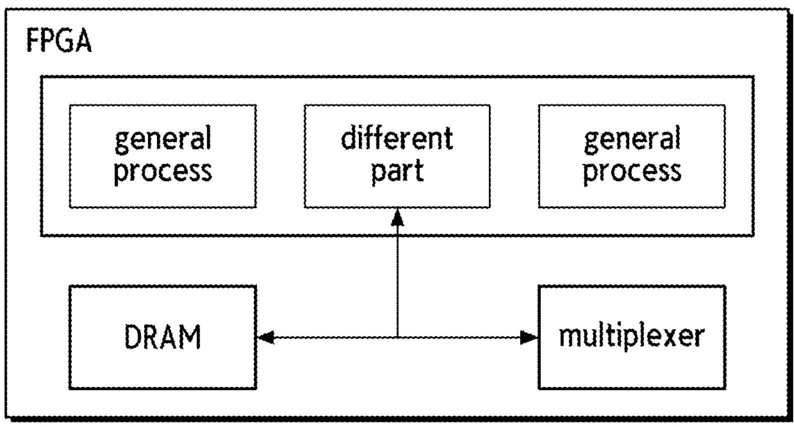
FIG. 6 illustrates a schematic diagram of a structure of a FPGA in a computational storage drive, according to an exemplary embodiment.

FIG. 6 illustrates a schematic diagram of a structure of a Field Programmable Gate Array (FPGA) in a computational storage drive, according to an exemplary embodiment.

Referring to FIG. 6, according to an exemplary embodiment, since a H.265 encoder with 1080 resolution uses about 83 k of Look-Up-Tables (LUTs), and when the SSD is modified to implement the computational storage drive, the modified SSD may provide 899 k of LUTs, and when the modified SSD is more fully utilized, 8-9 H.265 codecs may be configured. It may be considered that H.265 is an upgraded version of H.264, with roughly a same algorithmic architecture and an upgraded encoding unit and prediction method, and thus the codec framework may be implemented and differentiated in key portions to represent different portions of the FPGA of the exemplary embodiment as compared with the related art technology. A same video file may be multiplexed, and resampling of data that has been decoded is achievable for a dedicated circuit, so that a multiplexer may be implemented in the FPGA region.

Returning to reference to FIG. 5, according to an exemplary embodiment, the multimedia on demand method may be used in data processes in a streaming format. In an embodiment, the integrated circuit chip 506 in the computational storage drive 500 may be used to implement a codec (e.g., H.264, H.265, etc.) and a multiplexer in a pipeline form, and the processor 505 may be used to implement a key control flow in the multimedia on demand service in the pipeline form, such as a codec control and a host request control.

According to an exemplary embodiment, the processor 505 may include a stream controller 505-1 and a codec controller 505-2. In an exemplary embodiment, the integrated circuit chip 506 may include a multiplexer 506-1 and a codec 506-2. The performing, by the processor 505, the flow control may include performing, by the stream controller 505-1, the request control; and performing, by the codec controller 505-2, the codec control; wherein the performing, by the stream controller 505-1, the request control may include receiving a first request; in response to the first request, performing the following operations: in a case in which a request content of the first request is to obtain source data, requesting the source data from the controller 501 of the computational storage drive; in a case in which encoding parameters of the source data does not satisfy a preset requirement of encoding parameters, instructing the codec controller 505-2 by a transcoding request to control the codec 506-2 to transcode the source data and use the transcoded source data as the on demand result; in a case in which the encoding parameters of the source data satisfy the preset requirement of encoding parameters, instructing the codec controller 505-2 by an encapsulation request to control the multiplexer 506-1 to encapsulate the source data and use the encapsulated source data as the on demand result; in a case in which the request content of the first request is to change a resolution or to change an encapsulation format, instructing the codec controller 505-2 by an encapsulation request to control the multiplexer 506-1 to encapsulate corresponding multimedia data in accordance with the request content of the first request and use the encapsulated multimedia data as the on demand result. The performing, by the codec controller 505-2, the codec control may include controlling operation of the codec 506-2 and the multiplexer 506-1 based on the codec control; and setting parameters of the codec 506-2 based on the first request. In an embodiment, the encoding parameters may include, but are not limited to, an encoding format, a resolution, a bit rate, etc. Different devices and players may support different encoding standards, and performing encoding using different encoding standards can generate different encoding parameters (such as different encoding formats, resolutions, rates, etc.).

According to an exemplary embodiment, the performing, by the integrated circuit chip 506, at least one of the codec process or the multiplexing process may include at least one of the following operations: performing, by the multiplexer 506-1, the multiplexing process; or performing, by the codec 506-2, the codec process.

According to an exemplary embodiment, a processor is capable of running Linux, and in the multimedia on demand method of the exemplary embodiment, only a portion of the processor 505 may be used to run control software of the codec as the codec controller 505-2, and in some embodiments, only a single process may be run. Thus, Linux may be simplified to retain only component(s) to implement a process management program capable of high performance codec as the codec controller 505-2.

According to an exemplary embodiment, a portion of the processor 505 may be used to run complex bare-metal programs, and the complex bare-metal programs are capable of exhibiting high performance and can effectively guarantee real-time performance. The complex bare-metal programs may be used to implement the stream controller 505-1.

Figure 7:
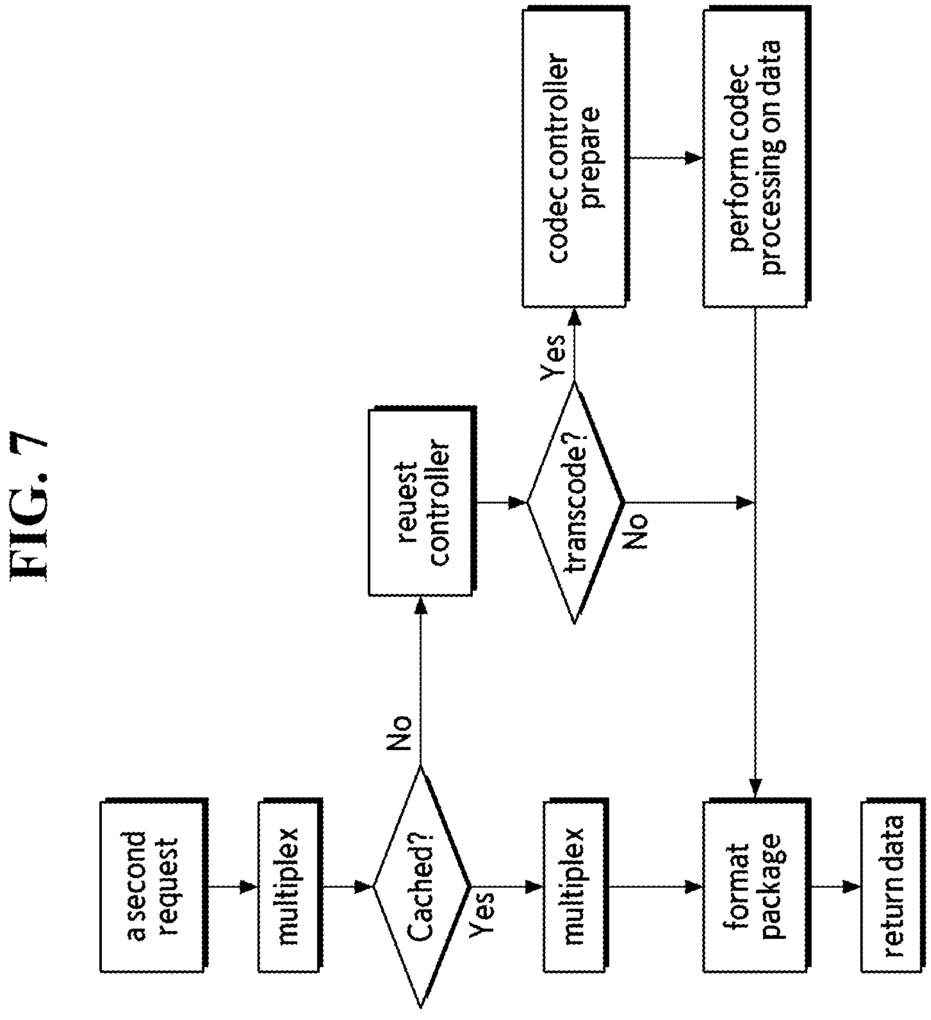
FIG. 7 illustrates a workflow diagram of a stream controller, according to an exemplary embodiment.

FIG. 7 illustrates a workflow diagram of a stream controller, according to an exemplary embodiment.

Figure 8:
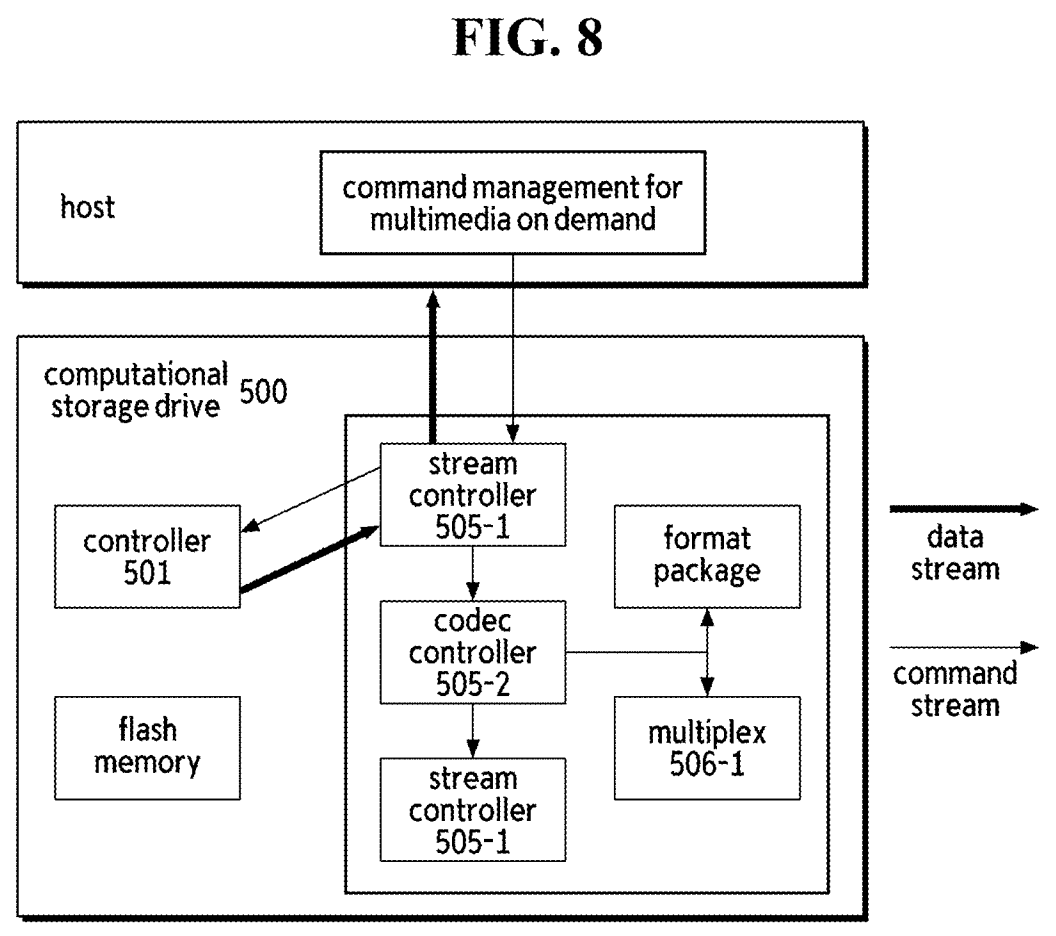

FIG. 8 illustrates a schematic diagram of a data flow interaction, according to an exemplary embodiment.

Referring to FIG. 7, with reference to FIG. 8, according to an exemplary embodiment, when a first request managed by a command of multimedia on demand arrives at the computational storage drive 500, the first request may be received by the stream controller 505-1, and the first request may then be parsed by the multiplexer 506-1 to determine whether corresponding video data indicated in the request content of the first request is cached in the computational storage drive 500. When the computational storage drive 500 caches different resolutions or encapsulation formats corresponding to a same video data in the request content of the first request, it is only necessary to perform secondary encapsulation on the video data by the multiplexer 506-1 in order to obtain a packaged streaming package that satisfies the requirement of the resolution or encapsulation format of the first request and return the packaged streaming package. When the corresponding video data is not cached in the computational storage drive 500, the data to be acquired is the source data, and the controller 501 in the computational storage drive 500 may acquire the source data from a storage module (e.g., DRAM 502 or flash memory 503, etc.). When the encoding parameters of the source data does not satisfy the preset requirement of encoding parameters in the first request, the source data needs to be transcoded, and at this time, the codec controller 505-2 may be instructed by the stream controller 505-1 through a transcoding request to control the codec 506-2 to transcode the source data to obtain a format-packed streaming packet as the on demand result. In a case in which the encoding parameters of the source data satisfies the preset requirement of encoding parameters in the first request, there is no need to transcode the source data, and at this time, the codec controller 505-2 may be instructed by the stream controller 505-1 through the encapsulation request to control the multiplexer 506-1 to obtain a streaming packet by format-packing the source data as the on demand result.

According to an exemplary embodiment, the performing, by the codec controller 505-2, the codec control may include, but is not limited to performing memory management during the codec process; and performing memory access management during data movement between the controller 501 of the computational storage drive 500 and the integrated circuit chip 506.

According to an exemplary embodiment, the codec controller 505-2 may be responsible for DRAM management during processing of the codec 506-2, as well as rational use of DMA (Direct Memory Access) to move data between the controller 501 and the FPGA 506.

According to an exemplary embodiment, the codec controller 505-2 may be responsible for rational operation of individual module pipelines in the codec 506-2, as well as controlling encoding rates.

Figure 9:
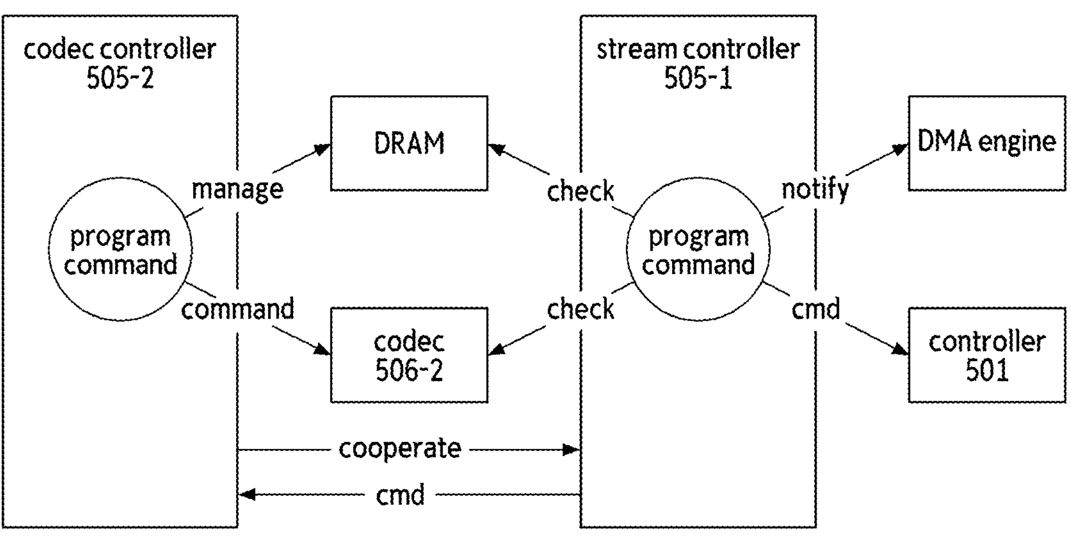
FIG. 9 illustrates an interaction schematic diagram when a stream controller and a codec controller operate, according to an exemplary embodiment.

FIG. 9 illustrates an interaction schematic diagram when a stream controller and a codec controller operate, according to an exemplary embodiment.

Referring to FIG. 9, according to an exemplary embodiment, in the process of performing the multimedia on demand method, the stream controller 505-1 may control operation of the codec controller 505-2 through a request control in a form of cmd (Command Prompt), so as to enable the codec controller 505-2 to cooperate with the stream controller 505-1. The codec controller 505-2 may manage the DRAM through operation of its own program instructions based on the request control transmitted by the stream controller 505-1, and may also control operation of the codec 506-2 in a manner of transmitting a command to the codec 506-2 (e.g., the codec controller 505-2 may perform the memory management during the codec process, and/or, perform the memory access management during data movement between the controller 501 of the computational storage drive 500 and the integrated circuit chip 506, etc.). In the stream controller 505-1, the instruction control of the codec controller 505-2 over the DRAM management and over the codec 506-2 may likewise be verified by the operation of its own program instructions, while the stream controller 505-1 may also notify the DMA (Direct Memory Access) engine through the operation of its own program instructions, and transmit instruction(s) to the controller 501 in the form of a cmd.

According to an exemplary embodiment, the performing, by the codec 506-2, the codec process may include performing the following processes in sequence on the source data based on parameters set by the codec controller 505-2 to obtain the on demand result: decoding; performing re-sampling and scaling, reconstructing image in a case of to-be-transcoded; and encoding.

According to an exemplary embodiment, parameters of the codec 506-2 may be set based on the codec controller 505-2. For example, parameters including, but not limited to, parameters of a module corresponding to the decoding standard, transcoding parameters, and parameters of a module corresponding to the encoding standard may be set.

Figure 10:
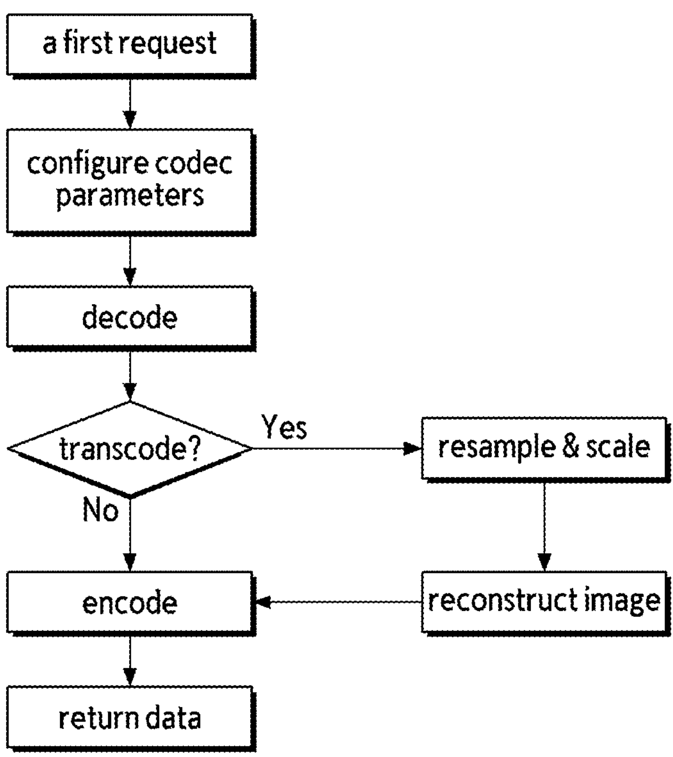
FIG. 10 illustrates a flowchart when a codec operates, according to an exemplary embodiment.

FIG. 10 illustrates a flowchart when a codec operates, according to an exemplary embodiment.

Referring to FIG. 10, according to an exemplary embodiment, when the stream controller 505-1 determines that encoding standard conversion is to be performed via the codec 506-2, the codec 506-2 may decode the source data based on parameters set by the codec controller 505-2; and continue to perform resampling and scaling, reconstructing image, etc. in a case of to-be-transcoded data. If the decoded data does not need to be transcoded, the data may be encoded and returned as the on demand result.

According to an exemplary embodiment, the performing, by the codec 506-2, the codec process may also include: in a pipeline form, performing the following processes in sequence on the source data based on parameters set by the codec controller 505-2 to obtain the on demand result: decoding, reconstructing; adjusting resolution by resampling in a case in which a usage rate of the codec is greater than a threshold; frame estimating, encoding, frame buffering.

Figure 11:
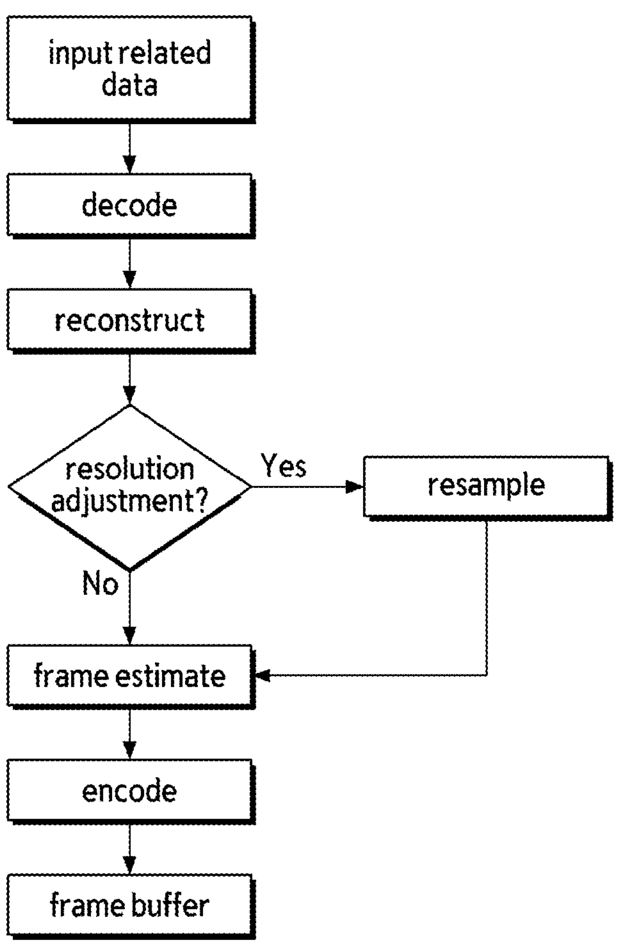
FIG. 11 illustrates a flowchart when a codec operates in a pipeline form, according to an exemplary embodiment.

FIG. 11 illustrates a flowchart when a codec operates in a pipeline form, according to an exemplary embodiment.

Referring to FIG. 11, according to an exemplary embodiment, after obtaining a relevant data input, the codec 506-2 may decode and reconstruct the data. In order to make pipeline implementation simple, resolution may not need to be adjusted during idle time, and thus, the resolution may be adjusted by resampling only when a usage rate of the codec is greater than a threshold; then processes, such as frame estimating, encoding, frame buffering, etc., may be performed on the data to obtain the on demand result. It may be appreciated that adjusting the resolution may also be considered a form of transcoding.

FIG. 12 illustrates a schematic diagram of a pipeline, according to an exemplary embodiment.

Referring to FIG. 12, according to an exemplary embodiment, a pipeline may be implemented for the codec 506-2, so that in a case in which resources such as LUT are sufficient, several more layers may be added to cooperatively work in order to increase concurrency of the on demand service. For example, the codec 506-2 may perform, in a pipeline manner, operations including, but not limited to: obtaining a relevant data input, decoding, and reconstructing; and adjusting resolution by resampling in a case in which a usage rate of the codec is greater than a threshold; frame estimating, encoding, and frame buffering.

FIG. 13 illustrates a comparison diagram of a related art technical solution with an exemplary embodiment.

Referring to FIG. 13, in a related art technical solution 1, after obtaining the source data from the SSD by the host through a command, a complete data processing process is performed on the source data at the host side. In a related art technical solution 2, a hardware device accelerator card is externally connected to the host side, and after obtaining the source data from the SSD by the host through a command, it is necessary to transfer the source data from the host to the accelerator card to perform the complete data processing process, and finally, the processed data is returned to the host from the accelerator card. By contrast, according to various exemplary embodiments, the data processing is transferred from the host or the accelerator card to the computational storage drive. Since the computational storage drive also stores data used by the host, the disadvantages of overloading the host due to the complete data processing in the related art solutions may be addressed, and thus interference with other tasks may be avoided, and hardware cost and power consumption may also be reduced because there is no need for an external accelerator card in addition to an external storage device (e.g., a conventional SSD, etc.). At the same time, since there is no additional hardware device (e.g., an accelerator card, etc.) added, the data transmission path is not additionally increased, which reduces the latency and reduces the bandwidth load of the bus with respect to the solution with the external accelerator card. It may be seen that the exemplary embodiment has clear improvement effects in terms of data transmission, hardware consumption and power consumption.

Figure 14:
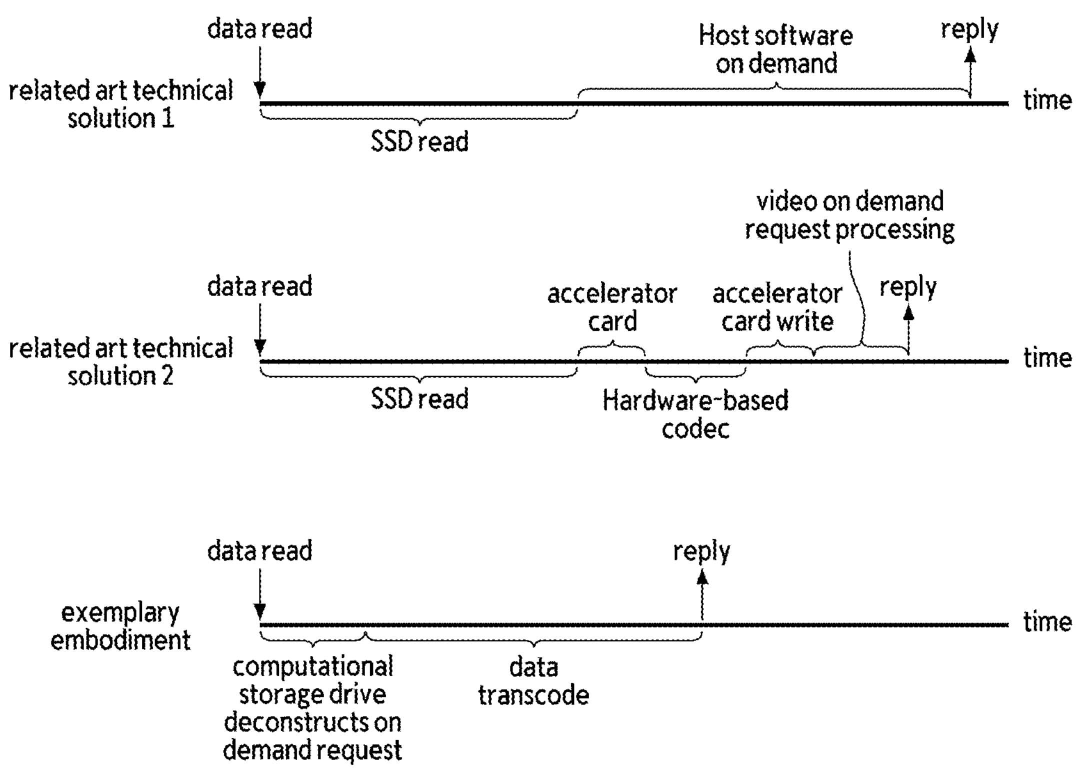
FIG. 14 illustrates a comparison diagram of a data processing time of a related art solution with an exemplary embodiment.

FIG. 14 illustrates a comparison diagram of a data processing time of a related art solution with that of an exemplary embodiment.

Referring to FIG. 14, in the related art technology, in a scheme 1 in which complete data processing of the source data is implemented through software at the host side, after an instruction to read the source data is given, the host side needs to wait for the data to be read from the SSD, and after the source data is acquired at the host side, the source data is processed by the software at the host side to implement the multimedia on demand process, and then the on demand result is returned.

In the related art technology, in a scheme 2 in which a speed of data processing is accelerated through an external hardware device accelerator card at the host side, after the host side gives an instruction to read the source data, the host side also needs to wait for the data to be read from the SSD, and after the source data is acquired at the host side, the host also needs to wait for the accelerator card to read the source data from the host side, and after the accelerator card reads the source data from the host side, hardware-based data processing such as encoding and decoding is performed by the accelerator card, and the processed data is written from the accelerator card to the host side, and finally the on demand result is obtained by video on demand request processing at the host side.

By contrast, in the exemplary embodiment, after the host side gives an instruction to read the source data, the computational storage drive deconstructs the on demand request and transcodes the corresponding on demand data, etc. to return the on demand result, so it may be seen that the exemplary embodiment is able to reduce the total time consumption of multimedia on demand.

Figure 15:
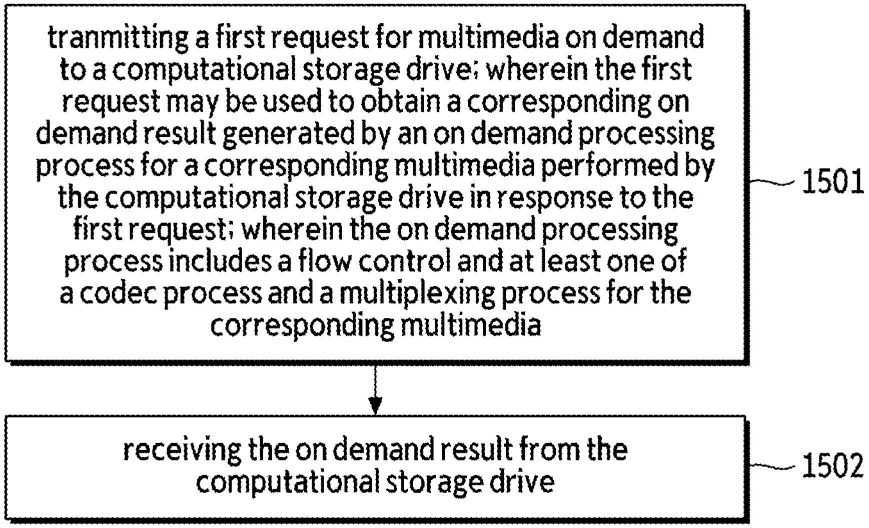
FIG. 15 illustrates a flowchart of a multimedia on demand method applied to a host, according to an exemplary embodiment.

FIG. 15 illustrates a flowchart of a multimedia on demand method applied to a host, according to an exemplary embodiment.

Referring to FIG. 15, an exemplary embodiment provides a multimedia on demand method applied to a host, which may include the following operations:

Operation 1501, a first request for multimedia on demand may be transmitted to a computational storage drive. The first request may be used to obtain a corresponding on demand result generated by an on demand processing process for a corresponding multimedia performed by the computational storage drive in response to the first request. The on demand processing process may include a flow control and at least one of a codec process or a multiplexing process for the corresponding multimedia;

Operation 1502, the on demand result may be received from the computational storage drive. For example, the host may receive the on demand result from the computational storage drive.

According to the exemplary embodiment, the multimedia on demand method applied to the host is performed in conjunction with a multimedia on demand method applied to the computational storage drive, and the specific implementation process in the exemplary embodiment is substantially the same as that in the above exemplary embodiments of the multimedia on demand method applied to the computational storage drive, and the description will not be repeated herein for conciseness.

Figure 16:
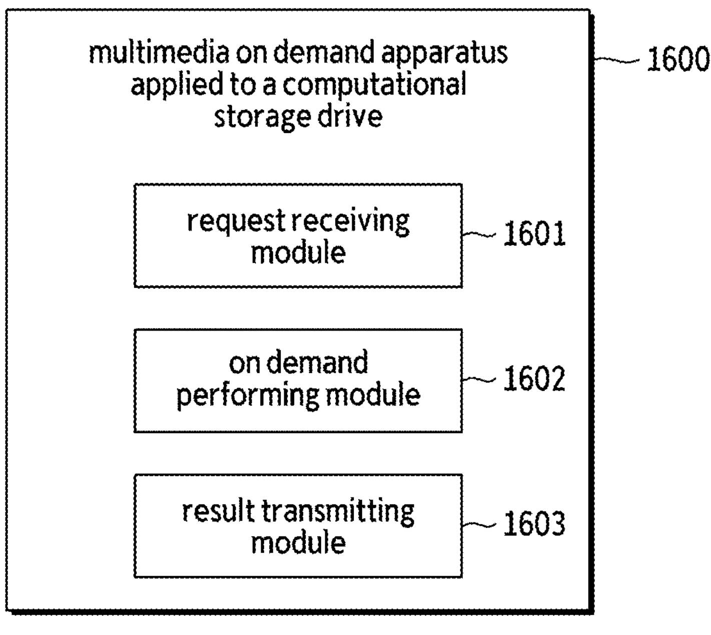
FIG. 16 illustrates a block diagram of a multimedia on demand apparatus applied to a computational storage drive, according to an exemplary embodiment.

FIG. 16 illustrates a block diagram of a multimedia on demand apparatus applied to a computational storage drive, according to an exemplary embodiment.

Referring to FIG. 16, an exemplary embodiment provides a multimedia on demand apparatus 1600 applied to a computational storage drive, which may include a request receiving module 1601, an on demand performing module 1602, and a result transmitting module 1603. In an embodiment, the multimedia on demand apparatus 1600 may include a memory that stores computer code and at least one processor that accesses the memory and executes the computer code to cause the at least one processor to implement the request receiving module 1601, the on demand performing module 1602, and the result transmitting module 1603. In some embodiments, the processor may include a plurality of processors, where each processor of the plurality of processors implements one or more of the request receiving module 1601, the on demand performing module 1602, and the result transmitting module 1603.

The request receiving module 1601 may receive, from a host, a first request for multimedia on demand.

The on demand performing module 1602 may perform, in response to the first request, an on demand processing process for a corresponding multimedia to generate a corresponding on demand result. The on demand processing process may include a flow control and at least one of a codec process or a multiplexing process for the corresponding multimedia.

The result transmitting module 1603 may transmit the on demand result to the host.

It may be understood that the individual modules in the above multimedia on demand apparatus 1600 applied to the computational storage drive are used to implement the above multimedia on demand method applied to the computational storage drive, and the specific implementation process in the exemplary embodiment is substantially the same as that in the exemplary embodiment in the above multimedia on demand method applied to the computational storage drive, and will not be described repeatedly herein for conciseness. The multimedia on demand apparatus 1600 applied to the computational storage drive may be configured as software, hardware, firmware, or any combination of software, hardware, or firmware for performing specific functions, respectively. For example, these modules in the apparatus may correspond to pure software code, to a specialized integrated circuit, or to a module that combines software and hardware. One or more of the functions implemented by these modules in the apparatus may also be uniformly performed by components in a physical entity device (e.g., a processor, client, or server, etc.).

Figure 17:
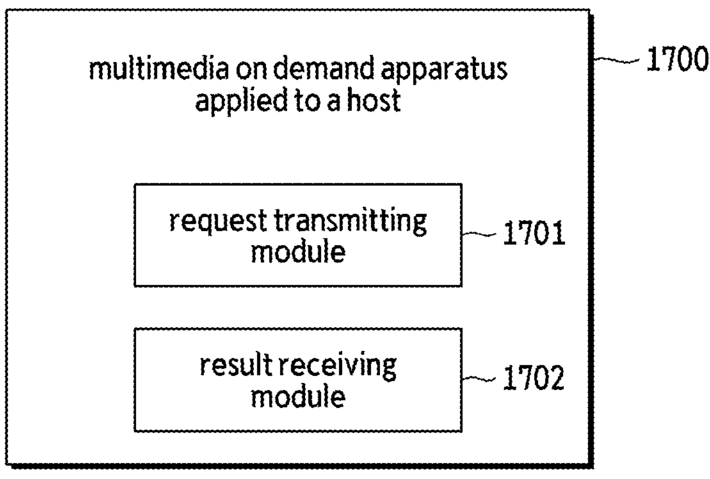
FIG. 17 illustrates a block diagram of a multimedia on demand apparatus applied to a host, according to an exemplary embodiment.

FIG. 17 illustrates a block diagram of a multimedia on demand apparatus applied to a host, according to an exemplary embodiment.

Referring to FIG. 17, an exemplary embodiment provides a multimedia on demand apparatus 1700 applied to a host, which may include a request transmitting module 1701 and a result receiving module 1702. In an embodiment, the multimedia on demand apparatus 1700 may include a memory that stores computer code and at least one processor that accesses the memory and executes the computer code to cause the at least one processor to implement the request transmitting module 1701 and the result receiving module 1702. In some embodiments, the processor may include a plurality of processors, where each processor of the plurality of processors implements one of the request transmitting module 1701 and the result receiving module 1702.

The request transmitting module 1701 may transmit, to a computational storage drive, a first request for multimedia on demand. The first request may be used to obtain a corresponding on demand result generated by an on demand processing process for a corresponding multimedia performed by the computational storage drive in response to the first request. The on demand processing process includes a flow control and at least one of a codec process and a multiplexing process for the corresponding multimedia.

The result receiving module 1702 may receive the on demand result from the computational storage drive.

It may be understood that the individual modules in the above multimedia on demand apparatus 1700 applied to the host are used to implement the above multimedia on demand method applied to the host, and the specific implementation process in the exemplary embodiment is substantially the same as that in the exemplary embodiment in the above multimedia on demand method applied to the host, and will not be described repeatedly herein. The multimedia on demand apparatus 1700 applied to the host may be configured as software, hardware, firmware, or any combination of software, hardware, or firmware for performing specific functions, respectively. For example, these modules in the apparatus may correspond to pure software code, to a specialized integrated circuit, or to a module that combines software and hardware. In addition, one or more of the functions implemented by these modules in the apparatus may also be uniformly performed by components in a physical entity device (e.g., a processor, client, or server, etc.).

Figure 18:
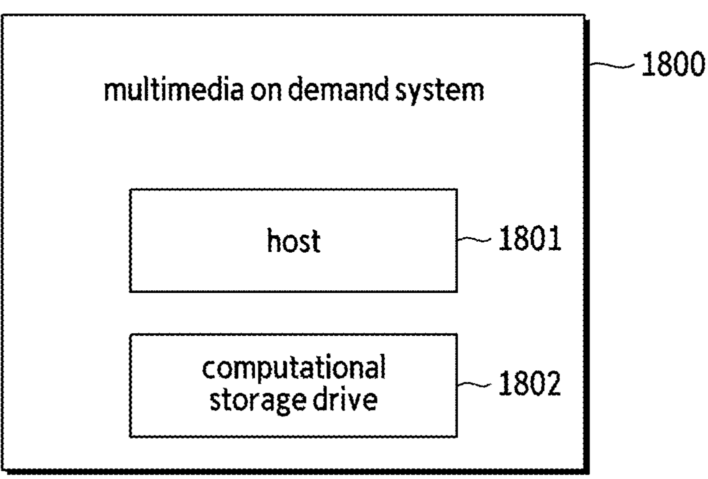
FIG. 18 illustrates a block diagram of a multimedia on demand system, according to an exemplary embodiment.

FIG. 18 illustrates a block diagram of a multimedia on demand system, according to an exemplary embodiment.

Referring to FIG. 18, an exemplary embodiment provides a multimedia on demand system 1800, where the multimedia on demand system 1800 may include a host 1801 and a computational storage drive 1802.

The host 1801 may transmit, to the computational storage drive 1802, a first request for multimedia on demand.

The computational storage drive 1802 may, in response to the first request, an on demand processing process for a corresponding multimedia to generate a corresponding on demand result. The on demand processing process may include a flow control and at least one of a codec process or a multiplexing process for the corresponding multimedia.

The computational storage drive 1802 may transmit the on demand result to the host 1801.

The host 1801 may receive the on demand result from the computational storage drive 1802.

It may be understood that the above multimedia on demand system 1800 is used to implement the above multimedia on demand method applied to the computational storage drive and the above multimedia on demand method applied to the host, and the specific implementation process in the exemplary embodiment is substantially the same as that in the above multimedia on demand method applied to the computational storage drive or the above multimedia on demand method applied to the host and is not described repeatedly herein for conciseness.

Figure 19:
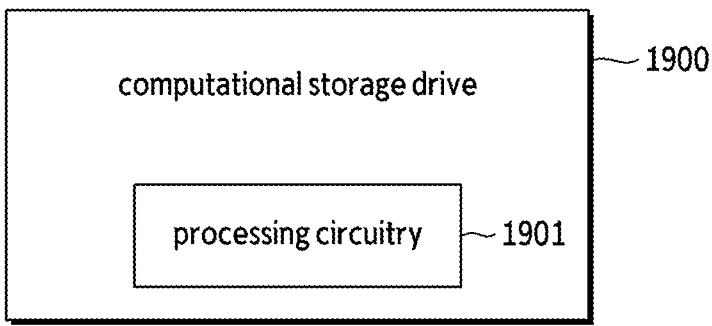
FIG. 19 illustrates a block diagram of a computational storage drive, according to an exemplary embodiment.

FIG. 19 illustrates a block diagram of a computational storage drive, according to an exemplary embodiment.

Referring to FIG. 19, an exemplary embodiment provides a computational storage drive 1900, the computational storage drive 1900 may include processing circuitry 1901. Furthermore, the processing circuitry 1901 of the computational storage drive 1900 may also implement any other modules, such as storage modules, etc., which are not limited by the present disclosure.

The processing circuitry 1901 may receive, from a host, a first request for multimedia on demand; and may perform, in response to the first request, an on demand processing process for a corresponding multimedia to generate a corresponding on demand result; wherein the on demand processing process includes a flow control and at least one of a codec process and a multiplexing process for the corresponding multimedia; and transmit the on demand result to the host.

It may be understood that the individual modules in the above computational storage drive 1900 are used to implement the above multimedia on demand method applied to the computational storage drive, and the specific implementation process in the exemplary embodiment is substantially the same as that in the above exemplary embodiment of the multimedia on demand method applied to the computational storage drive, and will not be described repeatedly herein for conciseness. The computational storage drive 1900 may be configured as software, hardware, firmware, or any combination of software, hardware, or firmware for performing specific functions, respectively. For example, the modules in the apparatus may correspond to pure software code, to a specialized integrated circuit, or to a module that combines software and hardware. In addition, one or more of the functions implemented by these modules in the apparatus may also be uniformly performed by components in a physical entity device (e.g., a processor, client, or server, etc.).

According to an exemplary embodiment, there may also be provided a computer readable storage medium storing instructions, wherein the instructions, when executed by at least one computing apparatus, cause the at least one computing apparatus to perform a multimedia on demand method as described above.

Examples of computer readable storage media herein include: Read Only Memory (ROM), Random Access Programmable Read Only Memory (RAPROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blue-ray or optical disk storage, Hard Disk Drive (HDD), Solid State Drive (SSD), card storage (such as multimedia cards, secure digital (SD) cards or extremely fast digital (XD) cards), magnetic tapes, floppy disks, magneto-optical data storage devices, optical data storage devices, hard disks, solid state disks, and any other devices that are configured to store computer programs and any associated data, data files and data structures in a non-transitory manner and provide the computer programs and any associated data, data files and data structures to a processor or computer so that the processor or computer may execute the computer programs. The instructions or computer programs in the computer readable storage medium described above may be executed in an environment deployed in a computer device, such as client, host, proxy device, server, etc. In addition, in one example, the computer programs and any associated data, data files, and data structures are distributed on a networked computer system, so that the computer programs and any associated data, data files, and data structures are stored, accessed and executed through one or more processors or computers in a distributed manner. It should be noted that the instructions may also be used to perform additional operations in addition to the operations described above or to perform more specific processing when performing the operations described above, and the content of these additional operations and further processing has already been referred to in the process of describing the relevant methods, and will therefore not be repeated herein in order to avoid repetition.

It should be noted that the multimedia on demand system according to the exemplary embodiments may rely entirely on operation of a computer program or instructions to implement the corresponding functions, i.e., the individual units correspond to the operations in the functional architecture of the computer program, such that the entire system is invoked to implement the corresponding functions by means of specialized software packages (e.g., libraries).

On the other hand, when the above multimedia on demand system is implemented as software, firmware, middleware, or microcode, program code or code segments for performing the corresponding operations may be stored in a computer readable medium, such as a storage medium, such that at least one processor or at least one computing apparatus may perform corresponding operations by reading and running the corresponding program code or code segments.

According to an exemplary embodiment, a storage apparatus may be integrated with a computing apparatus, e.g., RAM or a flash memory is deployed in an integrated circuit microprocessor, etc. The computing apparatus is capable of reading instructions stored in the storage apparatus.

According to an exemplary embodiment, a system may include at least one computing apparatus and at least one storage apparatus storing instructions, wherein the instructions, when executed by the at least one computing apparatus, cause the at least one computing apparatus to perform the method embodiments described above.

According to the multimedia on demand method, apparatus, system, computational storage drive, and storage medium, the computational storage drive may be used instead of a conventional SSD, and the multimedia on demand process such as encoding and decoding may be performed in the computational storage drive, which avoids occupation and consumption of the CPU of the host side when encoding and decoding is performed at the host side, and also reduces the use and maintenance costs of the hardware compared to introducing an additional accelerator card in addition to the conventional SSD. Performing data processing inside the computational storage drive allows a data transmission path between the host side and the computational storage drive to be maintained, and avoids increase in latency and bandwidth load caused by the need for an additional transmission path. By taking advantage of near-storage computing characteristics of the computational storage drive and the fact that the computing module is integrated inside the storage device, which can accelerate data processing with higher bandwidth and lower latency, a full-featured multimedia on demand system may be implemented based on the computing module of the computational storage drive to achieve the most optimal balance between improving the efficiency of the video on demand service, the transmission efficiency, the power consumption, and the cost.

After replacing the conventional SSD with the computational storage drive, the combination of the integrated circuit chip and the CPU in the computational storage device reduces the hardware use and maintenance costs compared to the introduction of the additional accelerator card in addition to the conventional SSD The above describes various exemplary embodiments, and it should be understood that the above description is only exemplary and not exhaustive, and the present disclosure is not limited to the disclosed exemplary embodiments. Without departing from the scope and spirit of the present disclosure, many modifications and changes will be apparent to a person of ordinary skill in the art. Therefore, the scope of protection of the present disclosure should be based on the scope of the claims.

What is claimed is:

1. A multimedia on demand method comprising:

receiving, by a computational storage drive from a host, a first request for multimedia on demand;

in response to the first request, performing, by the computational storage drive, an on demand processing process for multimedia that corresponds to the first request to generate a corresponding on demand result, the on demand processing process comprising a flow control and at least one of a codec process or a multiplexing process for the multimedia; and transmitting the on demand result to the host, wherein the computational storage drive comprises a processor and an integrated circuit chip; and wherein performing the on demand processing process comprises:

performing, by the processor, the flow control, the flow control comprising a codec control, and a request control that is performed based on the request control;

performing, by the integrated circuit chip, at least one of the codec process or the multiplexing process, wherein the processor comprises a stream controller and a codec controller;

wherein the integrated circuit chip comprises a multiplexer and a codec;

wherein performing, by the processor, the flow control comprises:

performing, by the stream controller, the request control; and performing, by the codec controller, the codec control;

wherein performing, by the stream controller, the request control comprises receiving the first request, and in response to the first request, performing:

in a case in which request content of the first request is to obtain source data, requesting the source data from a controller of the computational storage drive;

in a case in which encoding parameters of the source data do not satisfy a preset requirement of encoding parameters, instructing the codec controller by a transcoding request to control the codec to transcode the source data and use the transcoded source data as the on demand result;

in a case in which the encoding parameters of the source data satisfies the preset requirement of encoding parameters, instructing the codec controller by an encapsulation request to control the multiplexer to encapsulate the source data and use the encapsulated source data as the on demand result; and in a case in which the request content of the first request is to change a resolution or to change an encapsulation format, instructing the codec controller by the encapsulation request to control the multiplexer to encapsulate corresponding multimedia data in accordance with the request content of the first request and use the encapsulated multimedia data as the on demand result; and wherein performing, by the codec controller, the codec control comprises:

controlling an operation of the codec and the multiplexer based on the codec control; and setting codec parameters of the codec based on the first request.

2. The multimedia on demand method according to claim 1, wherein performing, by the codec controller, the codec control further comprises:

performing memory management during the codec process; and performing memory access management during data movement between the processor of the computational storage drive and the integrated circuit chip.

3. The multimedia on demand method according to claim 1, wherein performing, by the integrated circuit chip, the at least one of the codec process or the multiplexing process comprises at least one of:

performing, by the multiplexer, the multiplexing process; or performing, by the codec, the codec process.

4. The multimedia on demand method according to claim 1, wherein receiving, by the computational storage drive from the host, the first request comprises:

receiving, by the computational storage drive from the host, the first request in a case in which multimedia cache data that corresponds to the first request is not looked up in the host.

5. The multimedia on demand method according to claim 1, wherein the computational storage drive includes a dynamic random access memory (DRAM), a flash memory, the controller, and processing circuitry including the processor and the integrated circuit chip, and wherein the on demand processing process is performed by the processing circuitry.

6. A multimedia on demand system comprising:

a host; and a computational storage drive;

wherein the host transmits, to the computational storage drive, a first request for multimedia on demand;

wherein the computational storage drive, in response to the first request, performs an on demand processing process for multimedia that corresponds to the first request to generate a corresponding on demand result, the on demand processing process comprising a flow control and at least one of a codec process or a multiplexing process for the multimedia;

wherein the computational storage drive transmits the on demand result to the host; and wherein the host receives the on demand result from the computational storage drive, wherein the computational storage drive comprises a processor and an integrated circuit chip; and wherein the processor performs the flow control, the flow control comprising a codec control, and a request control that is performed based on the request control; and the integrated circuit chip performs at least one of the codec process or the multiplexing process, wherein the processor comprises a stream controller and a codec controller;

wherein the integrated circuit chip comprises a multiplexer and a codec;

wherein the stream controller performs the request control;

wherein the codec controller performs the codec control;

wherein the stream controller performs the request control to receive the first request, and in response to the first request, to perform:

in a case in which request content of the first request is to obtain source data, requesting the source data from a controller of the computational storage drive;

in a case in which encoding parameters of the source data do not satisfy a preset requirement of encoding parameters, instructing the codec controller by a transcoding request to control the codec to transcode the source data and use the transcoded source data as the on demand result;

in a case in which the encoding parameters of the source data satisfies the preset requirement of encoding parameters, instructing the codec controller by an encapsulation request to control the multiplexer to encapsulate the source data and use the encapsulated source data as the on demand result; and in a case in which the request content of the first request is to change a resolution or to change an encapsulation format, instructing the codec controller by the encapsulation request to control the multiplexer to encapsulate corresponding multimedia data in accordance with the request content of the first request and use the encapsulated multimedia data as the on demand result; and wherein the codec controller controls an operation of the codec and the multiplexer based on the codec control, and sets codec parameters of the codec based on the first request.

7. The multimedia on demand system according to claim 6, wherein the codec controller performs the codec control by:

performing memory management during the codec process; and performing memory access management during data movement between the processor of the computational storage drive and the integrated circuit chip.

8. The multimedia on demand system according to claim 6, wherein the multiplexer performs the multiplexing process, or the codec performs the codec process.

9. The multimedia on demand system according to claim 6, wherein the host does not look up multimedia cache data for the multimedia before transmitting the first request to the computational storage drive.

10. The multimedia on demand system according to claim 6, wherein the computational storage drive includes a dynamic random access memory (DRAM), a flash memory, the controller, and processing circuitry including the processor and the integrated circuit chip, and wherein the processing circuitry performs the on demand processing process.

11. A computational storage drive comprising processing circuitry configured to:

receive, from a host, a first request for multimedia on demand;

in response to the first request, perform an on demand processing process for multimedia that corresponds to the first request to generate a corresponding on demand result, the on demand processing process comprising a flow control and at least one of a codec process or a multiplexing process for the multimedia; and transmit the on demand result to the host, wherein the processing circuitry comprises a processor and an integrated circuit chip; and wherein the processor performs the flow control, the flow control comprising a codec control, and a request control that is performed based on the request control; and the integrated circuit chip performs at least one of the codec process or the multiplexing process, wherein the processor comprises a stream controller and a codec controller;

wherein the integrated circuit chip comprises a multiplexer and a codec;

wherein the stream controller performs the request control;

wherein the codec controller performs the codec control;

wherein the stream controller performs the request control to receive the first request, and in response to the first request, to perform:

in a case in which request content of the first request is to obtain source data, requesting the source data from a controller of the computational storage drive;

in a case in which encoding parameters of the source data do not satisfy a preset requirement of encoding parameters, instructing the codec controller by a transcoding request to control the codec to transcode the source data and use the transcoded source data as the on demand result;

in a case in which the encoding parameters of the source data satisfies the preset requirement of encoding parameters, instructing the codec controller by an encapsulation request to control the multiplexer to encapsulate the source data and use the encapsulated source data as the on demand result; and in a case in which the request content of the first request is to change a resolution or to change an encapsulation format, instructing the codec controller by the encapsulation request to control the multiplexer to encapsulate corresponding multimedia data in accordance with the request content of the first request and use the encapsulated multimedia data as the on demand result; and wherein the codec controller controls an operation of the codec and the multiplexer based on the codec control, and sets codec parameters of the codec based on the first request.

12. The computational storage drive according to claim 11, wherein the codec controller performs the codec control by:

performing memory management during the codec process; and performing memory access management during data movement between the processor of the computational storage drive and the integrated circuit chip.

13. The computational storage drive according to claim 11, wherein the multiplexer performs the multiplexing process, or the codec performs the codec process.

14. The computational storage drive according to claim 11, wherein the computational storage drive includes a dynamic random access memory (DRAM), a flash memory, the controller, and the processing circuitry.

* * * * *